United States Patent [19]
Jepsen et al.

[11] 3,830,486
[45] Aug. 20, 1974

[54] RAPID ACTION CLAMP

[75] Inventors: Kurt Friedrich Jepsen, Siegen; Bernard Stahl, Kirchen; Wolfgang Janzen, Obersdorf-Rodgen, all of Germany

[73] Assignee: Amsted-Siemag Kette GmbH, Betzdorf (Sieg.), Germany

[22] Filed: Apr. 18, 1972

[21] Appl. No.: 245,209

[30] Foreign Application Priority Data
Apr. 21, 1971 Germany............................ 2119281
July 17, 1971 Germany............................ 2135810
Oct. 4, 1971 Germany............................ 2149415

[52] U.S. Cl. ............................................ 269/216
[51] Int. Cl............................ B25b 1/06, B25b 1/16
[58] Field of Search ............. 269/32, 216, 229, 232, 269/240, 245; 100/280, 289; 82/36 A

[56] References Cited
UNITED STATES PATENTS
| | | | |
|---|---|---|---|
| 1,690,568 | 11/1928 | Bullard.......................... | 269/232 UX |
| 1,919,812 | 7/1933 | Swanson.......................... | 269/229 X |
| 3,726,163 | 4/1973 | Plath.................................. | 82/36 A |

*Primary Examiner*—Othell M. Simpson
*Attorney, Agent, or Firm*—Toren and McGeady

[57] ABSTRACT

A rapid action clamp comprises a thrust assembly through which a thrust is applied to the part to be clamped, and a thrust pin pivotally connected at one end to the thrust assembly and at its other end to a rotary actuator which is arranged coaxially with the thrust assembly and so that they are axially movable relative to each other, the thrust pin connections being eccentric with respect to the axis of the actuator and thrust assembly so that rotation of the actuator about the axis relative to the thrust assembly moves the thrust pin between a position in which it is skew to the axis and a position in which it extends parallel to the axis and exerts a clamping thrust, the thrust pin or another part through which the clamping thrust is transmitted being compressible in the direction of thrust transmission against spring loading. The thrust assembly is first moved to bring a member into engagement with the part to be clamped and then the actuator is rotated to exert the final clamping action. Usually, the thrust assembly carries the thrust pin and actuator, and is arranged so that it is rotated to screw it into the preliminary clamping position. In this case the rotary actuator is coupled to the thrust assembly so that they rotate together until preliminary clamping is effected, at which time the coupling becomes disengaged to allow the actuator to rotate relative to the thrust assembly and exert the final clamping.

27 Claims, 8 Drawing Figures

RAPID ACTION CLAMP

The invention relates to rapid action clamps, particularly for clamping tools, workpieces or other devices to machine tools, and is a modification of the type of clamp described in our copending application Ser. No. 178,559, now U.S. Pat. No. 3,726,163. The type of clamp described comprises a thrust assembly including a housing and a thrust plunger which is axially slidable in the housing and applies a thrust to the part to be clamped, and a thrust pin which is pivotally connected at one end to the plunger and at its other end to a rotary actuator which is mounted so that it is fixed axially relative to the housing but is rotatable about an axis eccentric to the axis of the thrust plunger. The arrangement is such that rotation of the actuator moves the thrust pin between a position in which it is skew to the plunger axis and a position in which it extends along the axis. Movement of the thrust pin to the latter position forces the thrust plunger further away from the actuator and hence exerts a clamping thrust. The thrust pin, or another part through which the clamping thrust is transmitted, is compressible in the direction of thrust transmission against spring loading. This means that during the swinging around of the thrust pin into its position along the plunger axis the clamping force increases gradually, finally reaching a predetermined value which is dependent on the spring loading. Due to the fact that the clamping thrust is never any more than what is needed, the rotary actuator remains easy to rotate. This is an improvement over conventional rapid action clamps in which, because the thrust pin is not spring loaded, the applied clamping force is not fully under control and consequently although a comparatively moderate clamping force may be sufficient for holding a workpiece securely in place, a much higher clamping force has to be used merely to ensure that the applied clamping force is sufficient.

However, because the rotary actuator is positioned eccentrically with respect to the longitudinal axis of the thrust assembly, the housing has to be made sufficiently large to accommodate this. In the form of rapid action clamp of the present invention the rotary actuator is positioned coaxially with the thrust assembly, and this enables a more compact clamp to be constructed.

According to this invention therefore, a rapid action clamp comprises a thrust assembly through which a thrust is applied to the part to be clamped, and a thrust pin pivotally connected at one end to the thrust assembly and at its other end to a rotary actuator, the thrust assembly and the rotary actuator being arranged coaxially and so that they are axially movable relatively to each other, and the connections of the thrust pin to both the thrust assembly and the rotary actuator being eccentric with respect to their axis so that rotation of the actuator about the axis relative to the thrust assembly moves the thrust pin between a position in which it is skew to the axis and a position in which it extends parallel to the axis and exerts a clamping thrust, the thrust pin or another part through which the clamping thrust is transmitted being compressible in the direction of thrust transmission against spring loading.

When the thrust assembly includes a housing within which the thrust pin and actuator are mounted and which is externally screw threaded and is arranged so that rotation of the housing moves a clamping part into initial engagement with the part to be clamped before the actuator is rotated to effect the final clamping, in the case of the clamp described in application Ser. No. 178,559 it is necessary to provide separate means for rotating the housing and the actuator. It is an advantage of the arrangement in accordance with the invention that, by providing means for coupling the rotary actuator and the thrust assembly so that they can be rotated together, and means for uncoupling them to allow rotation of the actuator relative to the thrust assembly when it is desired to exert the clamping thrust, only means for rotating the actuator is necessary and the entire clamping process can be made continuous. Initial rotation of the actuator also rotates the thrust assembly until the initial clamping is achieved. This prevents the assembly from rotating and, after uncoupling the assembly and the actuator, which can be made automatically, continued rotation of the actuator effects the final clamping.

In one form of clamp in accordance with the invention, the thrust assembly comprises a housing which surrounds the rotary actuator and which is coupled to the actuator for rotation therewith by means of a spring-loaded driver pin mounted in a bore in the actuator and projecting into engagement with a recess in the housing. Preferably the driver pin has a sloping surface on its end which cooperates with the housing so that when the torque applied to the rotary actuator reaches a predetermined value, the driver pin slips out of engagement with the housing against its spring loading, automatically uncoupling the rotary actuator from the housing.

The rotary actuator may be equipped with a lock for locking the driver pin, when desired, in engagement with the housing. This prevents the rotary actuator from rotating relative to the housing and so prevents the thrust pin from swinging around. The second part of the clamping action, during which the final clamping thrust is exerted, can therefore not take place.

The lock can for example take the form of a spring-loaded rod which slides in a bore in the rotary actuator and engages the driver pin to prevent disengagement of the pin from the housing, there being a catch to hold the rod away from the pin in an unlocked position.

The rotary actuator can if desired be rotated by hand, or it can be hydraulically, pneumatically or electrically driven. If the actuator is power driven, the clamp can be remote controlled. A further advantage of using hydraulic, pneumatic, or electric operation of the rotary actuator is that a number of individual rapid acting clamps can be operated simultaneously, so that the tool or workpiece is clamped in place rapidly and under the best conditions, that is to say by an evenly distributed clamping action. Hydraulic or pneumatic operation of the actuator has the advantage that the clamping action can easily be controlled by controlling pressures and/or rates of flow of the driving fluid.

In a hydraulically or pneumatically operated clamp each rotary actuator is coupled to a rotary piston motor, or is itself in the form of a rotary piston motor. The angular movement of the piston and hence the actuator is preferably limited by a stop located in the piston housing. The initial part of the angular movement first of all rotates the housing to produce the first part of the clamping action and the remainder of the angular movement, usually about 180° turns the actuator through this angle to complete the clamping action.

The rapid acting clamp in accordance with the invention has a wide variety of possible applications. The clamp may be used either as a clamping screw or as a clamping nut for clamping workpieces in place in machine tools. Alternatively the clamp may be constructed as a clamping spindle or clamping insert for a screw vise, or as a slide clamping device, or as a jaw chuck.

Jaw chucks are usually used for clamping workpieces in place and have at least one movable clamping claw. it is desirable to be able to apply a clamping thrust or clamping tension to the claw of the chuck, or to any other kind of clamping claw, in either direction.

For this purpose, preferably the thrust pin acts between the rotary actuator and a thrust member, both of which are slidably mounted axially between thrust bearings and within a rotatable housing which is coaxial with the axis of the actuator, the housing cooperating through a screw thread with a clamping member, and the rotary actuator and the thrust member being retained in the housing by collars at opposite ends of the housing, the collars and the thrust bearings being arranged so that when the clamping thrust is exerted the housing is caused to move axially relative to either the actuator or the thrust member.

The fixed bearing surfaces for the rotary actuator and for the thrust member are preferable surfaces of the jaw chuck, or of the machine frame supporting the clamping member. The machine frame can for example take the form of a lathe chuck. In this case the clamping member has an internal screw thread which engages with an external thread on the housing. Assuming that the housing is spring loaded, the clamp functions as follows. Rotation of the rotary actuator, in one direction or in the other, rotates the housing and moves the clamping member axially along the surface of the housing, in one axial direction or the other, until the clamping member makes contact with the workpiece. With further rotation of the rotary actuator the housing moves through a limited distance in the opposite axial direction. Depending on the direction this movement is limited in either one of two ways. In one case one of the collars of the housing makes contact with the thrust member so that the member, acting through the spring-loaded thrust pin, thrusts the rotary actuator against its fixed bearing surface. In the other case the other collar of the housing makes contact with the rotary actuator so that the actuator, acting through the spring-loaded thrust pin, thrusts the thrust member against its fixed bearing surface. With further rotation of the actuator, the actuator and the housing becomes uncoupled and the thrust pin is then swung around to the clamping action. It should be noted that after the rotary actuator has been uncoupled from the housing the frictional resistance in the thread between the housing and the clamping member is greater than the frictional resistance at the two ends of the spring-loaded thrust pin. Consequently the rotary actuator can now, if desired, be rotated in the opposite direction. In this movement rotation of the rotary actuator relative to the thrust member can be limited by mechanical stops which permit the spring-loaded thrust pin to be swung around, after the uncoupling, only by rotation in the one direction.

The movable clamping member cooperates either with other similarly actuated clamping members or with a fixed clamping member which can for example be fixed to a frame which supports the bearing surfaces for the rotary actuator and for the thrust member. Several examples of clamps in accordance with the invention will now be described with reference to the accompanying drawings, in which.

Figure 1:
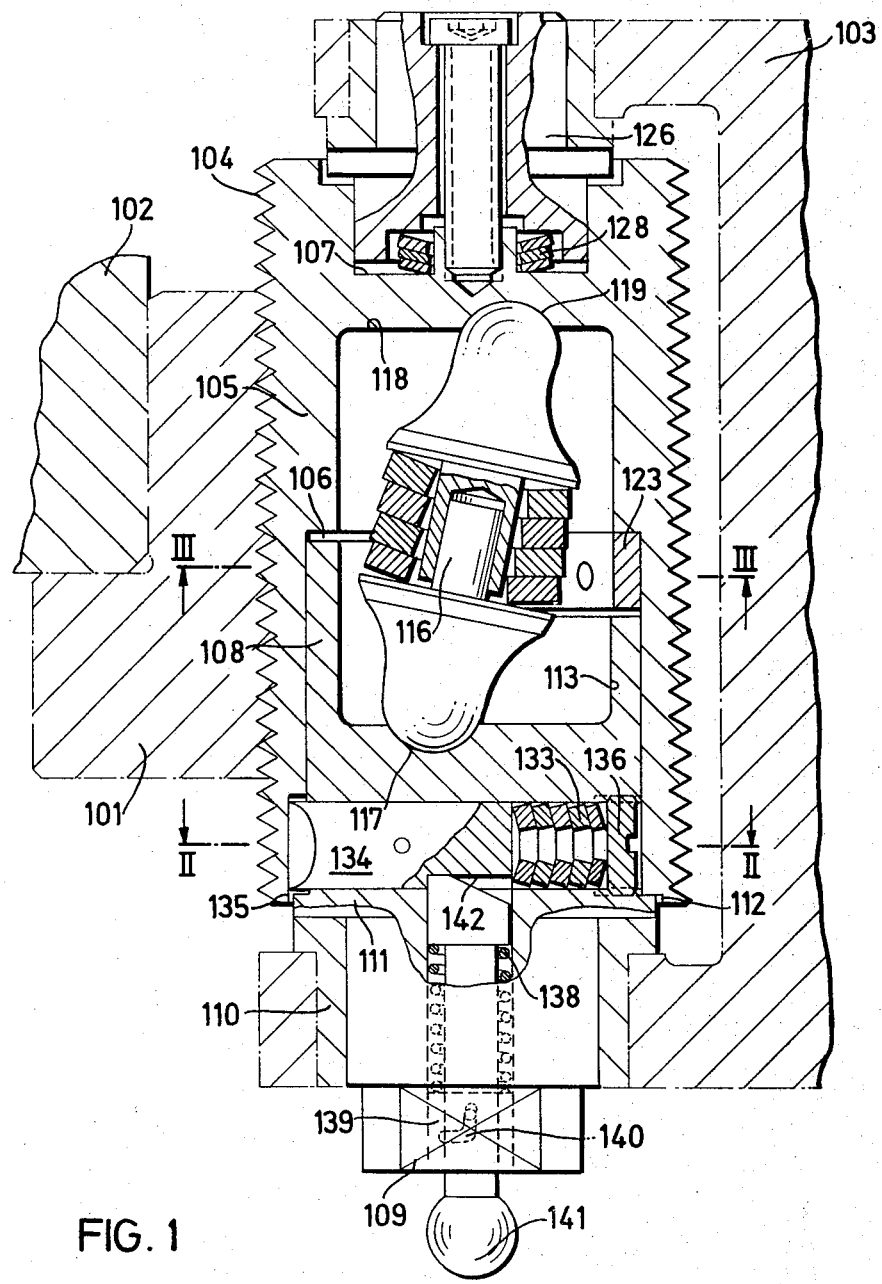
FIG. 1 is an axial section through one example.

The rapid acting clamp shown in FIG. 1 has a clamping claw 101 for applying a clamping thrust to a workpiece 102. A cylindrical, rotatable thrust housing 105 has an external thread 104 and contains two blind bores 106, 107 which are coaxial with the thrust housing 105. The two blind bores have different depths. The deeper blind bore 106 contains a central rotary actuator 108 which has on its lower end, that is to say on the end projecting downwards, as shown in FIG. 1, from the blind bore 106, a square or hexagonal nut 109. The rotary actuator 108 is mounted to rotate in a thrust bearing 110 in a clamp frame 103 which surrounds the parts of the rapid acting clamp. The rotary actuator 108 has a collar 111 which thrusts, on the one hand, against the thrust bearing 110 and, on the other hand, against a shoulder 112 of the blind bore 106. The upper part of the rotary actuator 108, that is say the part which projects into the blind bore 106, has a recess 113 containing the lower part of the spring-loaded compressible thrust pin 116. The lower end of the thrust pin is hemispherical and works in a hemispherical cup which is positioned eccentrically with respect to the axis of the rotary actuator 108. The upper end of the spring-loaded thrust pin 116 is also hemispherical and works in a hemispherical cup 119 positioned eccentrically in the bottom 118 of the blind bore 106. Each of the two hemispherical cups 117 and 119 is positioned eccentrically with respect to the axis of rotation of the rotary actuator 108.

When the parts are in the positions shown in FIG. 1, the axis of the spring-loaded thrust pin 116 forms an angle with the axis of rotation of the rotary actuator 108. Under these circumstances the rapid acting clamp is unloaded. The rotation of the rotary actuator 108 is limited by a projection 123 projecting inwards into the blind bore 106, the projection 123 working in a groove which extends only part of the way around the periphery of the rotary actuator 108.

At its upper end, that is to say the end away from the rotary actuator 108, the housing 105 is supported by a support pin 126 which is mounted to rotate in the clamp frame 103.

In the part of the rotary actuator 108 which projects into the blind bore 106 there is a transverse bore 137 extending perpendicularly to the axis of rotation of the rotary actuator 108. The transverse bore 137 contains a driver pin 134 which is spring-loaded by plate springs 133. One end of the driver pin 134 has a sloping face. This end of the pin engages in a groove 135 extending axially in the thrust housing 105. The plate springs 133 are interposed between the driver pin 134 and a nut 136 screwed into the transverse bore 137. Screwing the nut 136 inwards in the bore 137 increases the spring load applied by the plate springs 133 to the driver pin 134.

Extending axially through the rotary actuator 108 there is a further bore containing a spring loaded stop rod 141 which slides in a bush 139. The stop rod 141 is loaded by a spring 138 and guided in its movement by a catch groove 140. The function of the stop rod is to lock the driver pin 134, the stop rod engaging in a recess 142 in the driver pin. The driver pin 134 is prevented from rotating in the bore 137 by a pin 143, as shown in FIG. 2.

The clamp functions as follows. When the rotary actuator 108 is rotated, the rotation is at first transmitted to the thrust housing 105 by the driver pin 134. The rotation of the thrust housing 105 drives the internally threaded clamping claw 101 forwards against the workpiece 102. When the torque applied to the thrust housing 105 reaches a predetermined value, which is adjustable by adjusting the load on the plate springs 133 by means of the nut 136, the driver pin 134 disengages from the housing, so that with further rotation of the rotary actuator 108 the thrust housing 105 remains at a standstill. Consequently, with the further rotation of the rotary actuator 108 the spring-loaded thrust pin 116 swings around until its axis becomes parallel to the axis of rotation of the rotary actuator 108. This movement thrust the upper end of the thrust housing 105 forward the thrust being transmitted through the clamping claw 101 to the workpiece 102, finally clamping the workpiece firmly in place.

Figure 2:
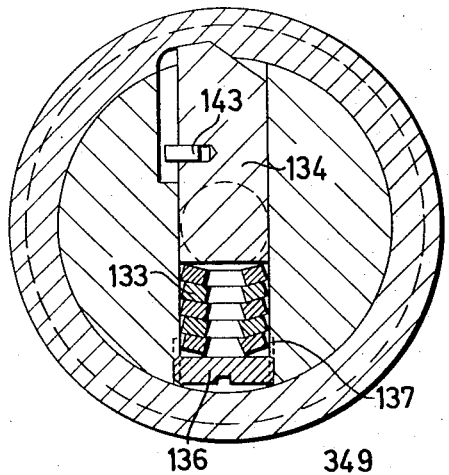
FIG. 2 is a radial section taken along the line II—II in FIG. 1.

If the operator wishes not to bring the spring-loaded thrust pin 116 into play, he advances the stop rod 141 so as to lock the driver pin 134 in its engaged position, as shown in FIG. 2, before first rotating the actuator 108. It should be observed that the spring-loaded thrust pin 116 functions only when the rotary actuator 108 is rotated clockwise. During anticlockwise rotation of the rotary actuator 108 the drive is transmitted by positive engagement with the projection 123 of the thrust housing 105.

Figure 3:
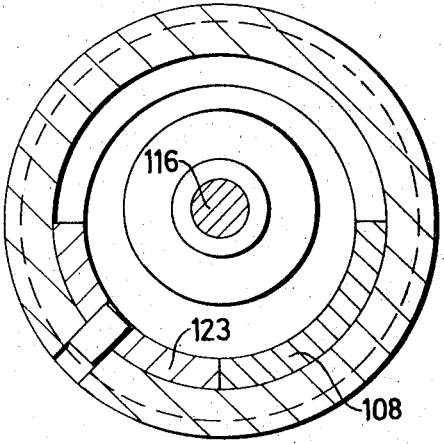
FIG. 3 is a radial section taken along the line III—III in FIG. 1.

The rapid action clamp shown in FIGS. 1 to 3 applies a clamping thrust in one direction only. The clamp shown in FIG. 4, on the other hand, is capable of applying a clamping thrust in either axial direction. The clamping claw 201 can be applied either to the inner surface or to the outer surface of the workpiece 202. Instead of the thrust housing 105 and the support pin 126 there is a cylindrical thrust housing 205 having an external left-hand thread 204, a thrust member 248 and a thrust bearing 249. The thrust housing 205 has a stepped bore.

In this case the projection 123 for limiting the rotary movement of the actuator is replaced by a recess in the face of the thrust member 248. The thrust member 248 is stepped at 254 to form a terminal part of lesser diameter which slides in a bearing 249.

The thrust housing 205 has an internal collar 255 for retaining the rotary actuator, and an upper internal collar 252 in the form of a screwed in part which engages with the shoulder 254 of the thrust member 248. The thrust member 248 slides up and down in the thrust housing 205, the terminal part of smaller diameter sliding in the bearing 249. The thrust member 248 is prevented from rotating in the thrust housing 205 by a key in a keyway 247. The upward thrust of the thrust housing 205 is taken by an external flange 251 on the bearing 249. Between the internal collar 252 of the thrust housing 205 and the flange 251 there are plate springs 253 which, when the clamp is in the unloaded state, thrust the housing 205 downwards so that its internal collar 252 thrust against the shoulder 254 of the thrust member 248. The downward thrust is transmitted through the thrust member 248 and through the spring-loaded thrust pin to the rotary actuator, thrusting it downwards against its bearing in the clamp frame.

Figure 4:
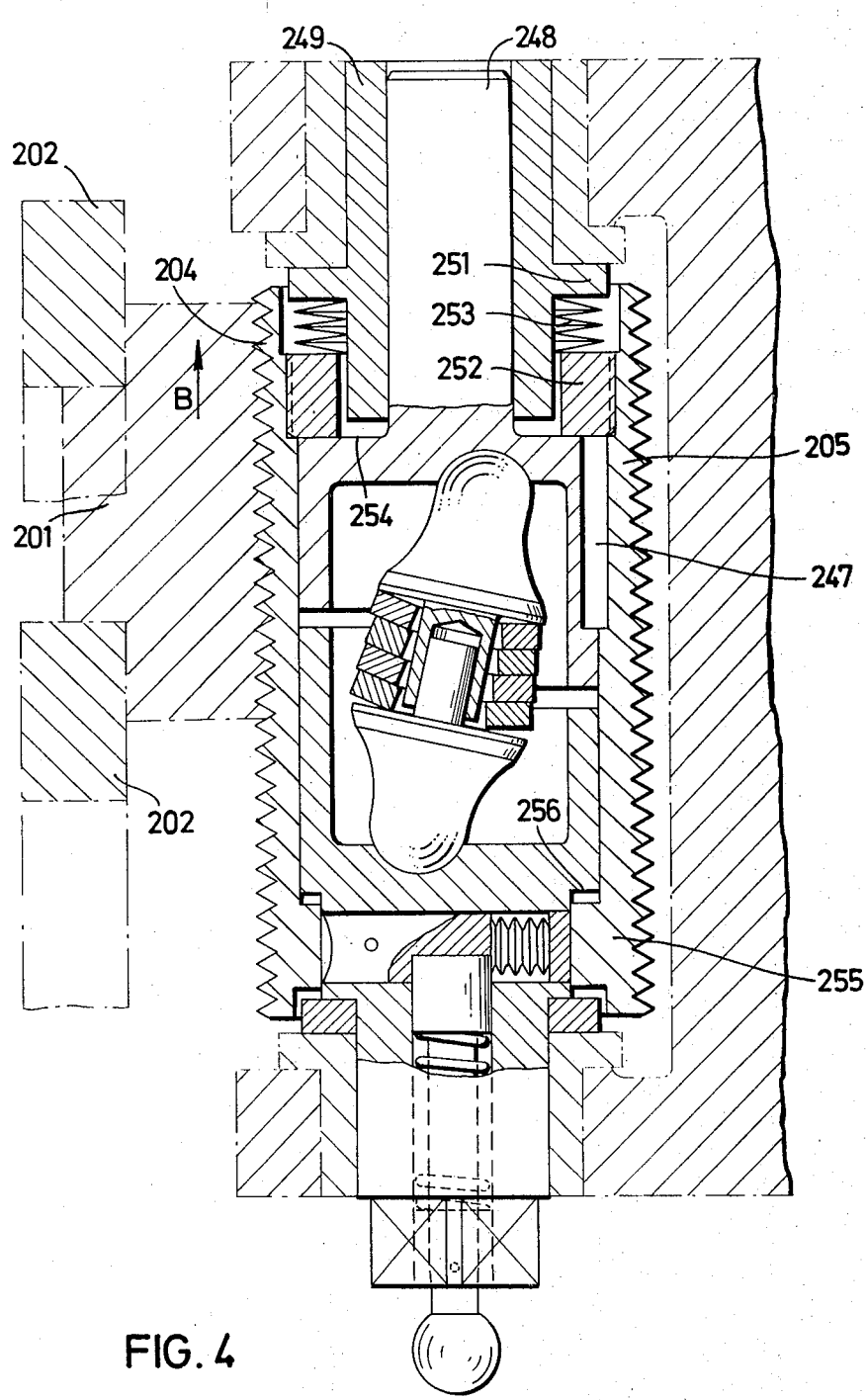
FIG. 4 is an axial section through a modification of the rapid acting clamp shown in FIGS. 1 to 3.

The clamp functions as follows. When the rotary actuator is rotated clockwise the clamping claw 201 advances upwards, thrusting the annular workpiece 202 upwards, as shown in FIG. 4, the thrust being applied in the radial direction of the annular workpiece 202. This applies a downward reaction thrust to the thrust housing 205. The downward reaction thrust is transmitted through the spring-loaded thrust pin to the rotary actuator, thrusting it even more firmly against its bearing in the clamp frame. During this movement, torque is transmitted from the rotary actuator to the thrust housing by a transverse driver pin of the rotary actuator as in the example of FIG. 1. As soon as the torque applied to the rotary actuator exceeds a predetermined value the transverse driver pin disengages, by the action of its sloping end face, from the internal collar 255 of the thrust housing 205. From this instant onwards, with further rotation of the rotary actuator, the thrust housing 205 remains angularly stationary and the rotary actuator swings the spring-loaded thrust pin around into the position in which its axis is parallel to the axis of the rotary actuator, clamping the workpiece firmly in place.

On the other hand, when it is desired to clamp the workpiece 202 from the outside, that is to say by thrusting in the opposite direction, the clamp functions as follows. The rotary actuator is rotated anticlockwise so that the clamping claw 201 now thrust downwards, that is to say against the outside of the annular workpiece 202 in a radial direction with respect to the latter. This applies an upward reaction thrust to the housing 205 in the direction of the arrow B. The plate springs 253 are compressed, until finally the internal collar 255 of the thrust housing 205 comes up against a shoulder 256 on the rotary actuator. With further upward movement of the thrust housing 205 the rotary actuator is lifted, the movement being transmitted through the spring-loaded thrust pin to the thrust member 248, until the member 248 thrusts upwards against the bearing 249. With further rotation of the rotary actuator the friction in the thread 204 increases until it exceeds the friction between the rotary actuator and the spring-loaded thrust pin sufficiently to disengage the driver pin from the internal collar 255 of the housing, the clamping claw 201 still thrusting firmly against the workpiece 202. Further rotation of the rotary actuator then swings the spring-loaded thrust pin around to bring its axis parallel to that of the actuator, finally clamping the workpiece in place.

When it is desired to release the clamp, the procedure is as follows. The rotary actuator is rotated in the thrust housing until the driver pin re-engages with the housing. The clamp is then released by a further rotation. It should be remarked that the direction of rotation of the rotary actuator need not necessarily be that described above. The clamp can be constructed for rotation of the rotary actuator in either direction. For clamping the workpiece 202 a suitable counter-support must be provided.

Figure 5:
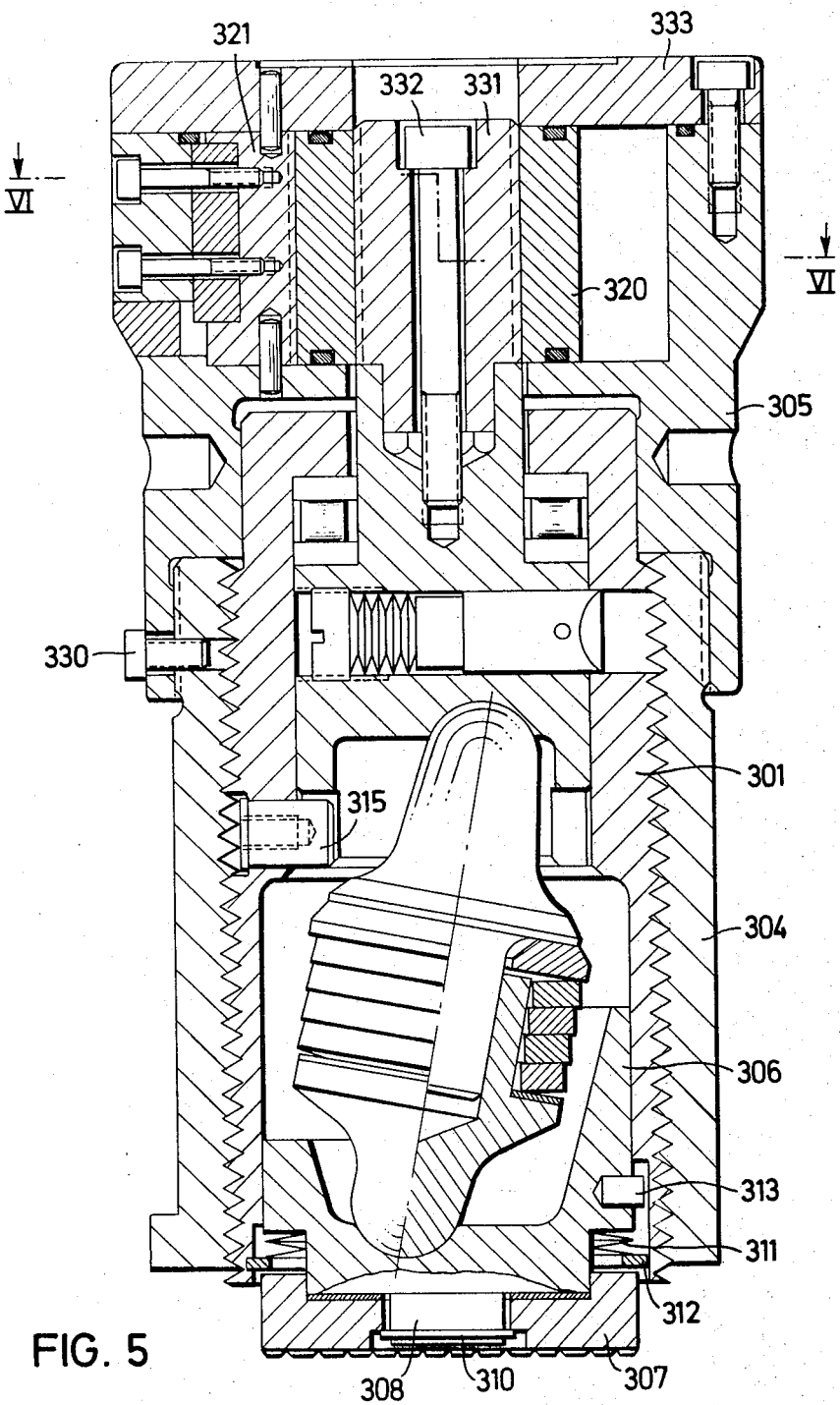
FIG. 5 is an axial section through another example and taken along the line VI—VI in FIG. 6.

In the example shown in FIG. 5 the rapid action clamp has a housing 301 which contains a spring-loaded expanding thrust pin and a rotary actuator. In this case the lower end of the thrust pin, that is to say the end away from the rotary actuator, is supported at a location eccentric to the rotary actuator axis by a thrust part 306 which has a centrally projecting pin 308 for attaching a terminal gripping member or clamping claw 307. The clamping claw 307 has an outer raised edge surrounding the thrust part 306. The claw 307 is retained on the projecting pin 308 by a circlip 310 and is rotatable on the thrust part 306. Between the inner end face of the raised edge of the clamping claw 307 and an annular shoulder of the thrust part 306 there is an annular gap containing a number of plate springs 311. The plate springs act between a retainer ring 312 held in an internal groove in the housing 301, and the shoulder of the part 306. The annular gap is wide enough to allow the thrust part 306 with its clamping claw 307 to move axially in the housing 301, against the influence of the plate springs 311. The thrust part 306 is prevented from rotating in the housing 301 by a pin 313.

The angular range of rotation of the rotary actuator in the housing 301 is limited to 180° by a pin 315 projecting inwards from the housing 301 into a 180° groove in the rotary actuator, as it is in the examples represented in FIGS. 1 and 4. This determines the two limiting positions of the spring-loaded thrust pin in the housing 301. The rotary actuator is coupled to the housing 301 by a driver pin, as in FIGS. 1 and 4.

The rotary actuator is driven by a rotary piston 320 which works in a piston housing 305 screwed to a sleeve 304 which is itself screwed to the housing 301. The rotary piston housing 305 is locked to the sleeve 304 by a locking screw 330, to prevent unscrewing of the rotary piston housing 305.

The rotary piston 320 is fixed to a connector 331 which has an axially projecting pin of hexagonal cross section. The hexagonal pin is inserted into a hexagonal recess in the upper end of the rotary actuator. The upper end of the rotary actuator is in the form of a projecting part which penetrates through the upper end wall of the housing 301 and through the lower wall of the rotary piston housing 305. The connector 331 is secured to the rotary actuator by a screw 332 which extends through an axial bore in the connector 331, the lower end of the screw being screwed into the rotary actuator. This prevents the connector 331 from leaving the rotary actuator. The distance between the rotary piston 320 and the rotary driver is adjustable. Drive is transmitted from the rotary piston 320 through the connector 331 to the rotary actuator.

The upper end of the rotary piston housing 305, that is to say the end away from the rotary actuator 302 and away from the sleeve 304, is closed by a cover plate 333, in order to facilitate manufacture and assembly of the rotary piston motor. The rotary piston motor, shown in cross section in FIG. 6, has a piston 320 in the form of a ring from which projects radially a vane whose outer edge surface slides on the inner cylindrical surface of the housing 305. There is a good seal between the sliding surfaces. The rotary piston housing 305 is in the form of a ring. Projecting radially inwards from the inner surface of this ring there is a wall 321 whose inner edge makes a good sliding seal with the outer surface of the ring of the rotary piston 320. To facilitate manufacture the wall 321 is a separate part screwed to the rotary piston housing 305 and secured by a key in a slot. The wall 321 limits the angular movements of the rotary piston 320. Fluid inlet and outlet connections 334 and 335 penetrate through the wall of the rotary piston housing 305 on either side of the wall 321.

The clamp functions as follows. Assuming that the parts are initially in the positions represented in FIGS. 5 and 6, compressed air or hydraulic oil is introduced through the inlet connection 334 into the interior of the rotary piston housing 305. The exhaust connection 335 is opened to give the rotary piston freedom of movement. The pneumatic or hydraulic pressure drives the piston 320 so that it rotates clockwise. Rotation through the first 135° is available for "starting" the housing 301. Let it be assumed for example that the sleeeve 304 is firmly fixed by screwing to the tool rest of a machine tool. When the rotary piston motor is driven in rotation, rotating the rotary actuator and the housing 301 through connector 331, the assembly of the connector 331, the bolt 332, the actuator and the housing 301, screws itself axially downwards into the sleeve 304, applying a preliminary clamping thrust to the workpiece. The rotary piston 320 then has 180° of rotational freedom remaining, for finally clamping the workpiece in place. Even if more than 135° are used in starting the housing 301, that is to say in the preliminary clamping of the workpiece, there can in many cases still remain sufficient angular freedom of movement for completing the final clamping of the workpiece in place.

Usually however, a rotation through 135° is not necessary for effecting the preliminary clamping. As soon as the clamping claw 307 comes into contact with the surface of the workpiece the downward movement of the housing 301 is arrested and the transverse driver pin of the rotary actuator disengages from the housing and the final clamping action is effected by the swinging around of the spring-loaded thrust pin due to the continued rotation of the actuator while the housing remains angularly static.

The swinging around of the spring-loaded thrust pin into its axially parallel position advances the clamping claw 307 towards the workpiece through a distance which can for example be 1.3 mm, the exact distance depending on the prevailing circumstances. This compares with a distance of for example 4 mm advanced towards the workpiece by the housing 301 during the preliminary clamping action.

The pressure in the rotary piston housing, that is to say the pressure behind the rotary piston 320 is preferably released once the spring-loaded thrust pin has reached its terminal position, because the thrust pin and the housing 301 together form a self-locking system and have no tendency to return to their initial positions under the influence of the clamping reaction thrust. To release the clamp, hydraulic fluid or compressed air is admitted through the connection 335, the pump chamber being vented through the connection 334.

Figure 6:
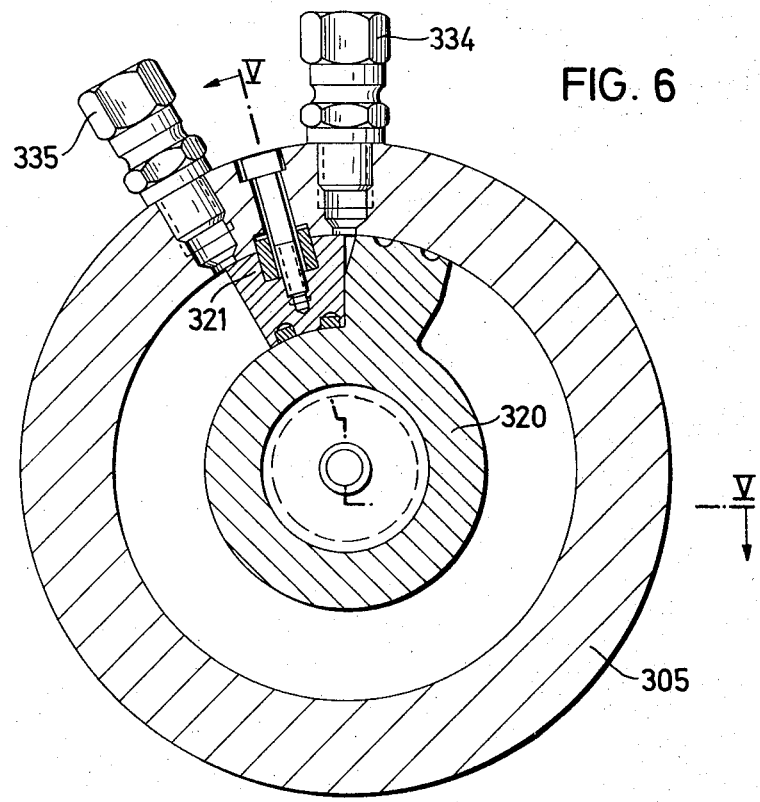
FIG. 6 is a cross section taken along the line V—V in FIG. 5.

In those cases where several rapid action clamps of the kind shown in FIGS. 5 and 6 are used for clamping a workpiece, all the rotary piston motors are connected to a common hydraulic or pneumatic circuit. The individual rotary pistons 320 can be actuated individually and independently by interposing control valves, or in groups, or all together.

Figure 8:
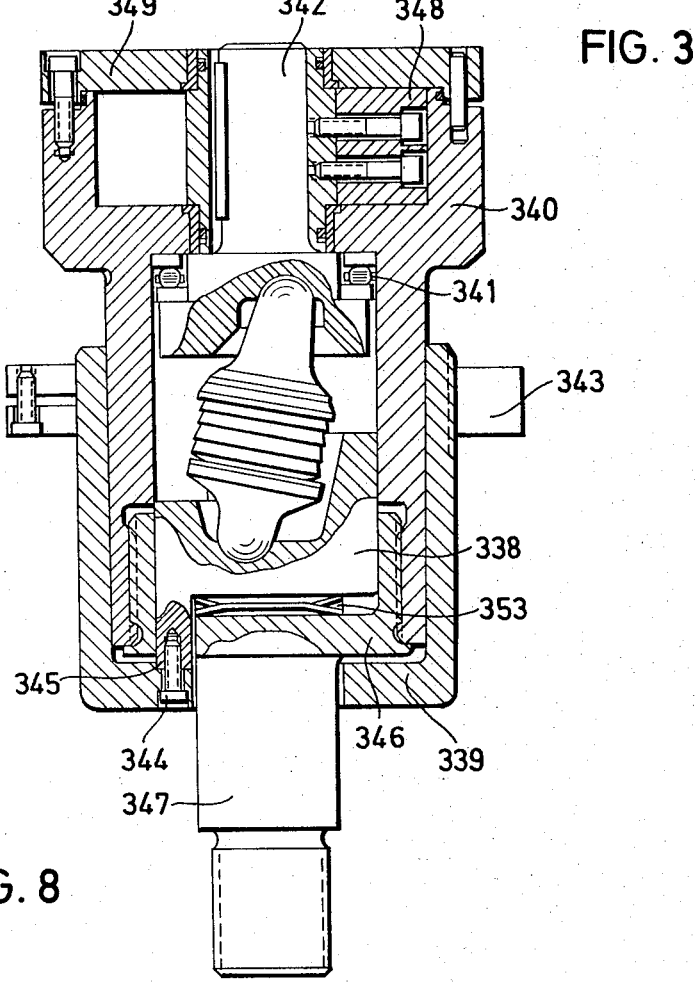
Figure 7:
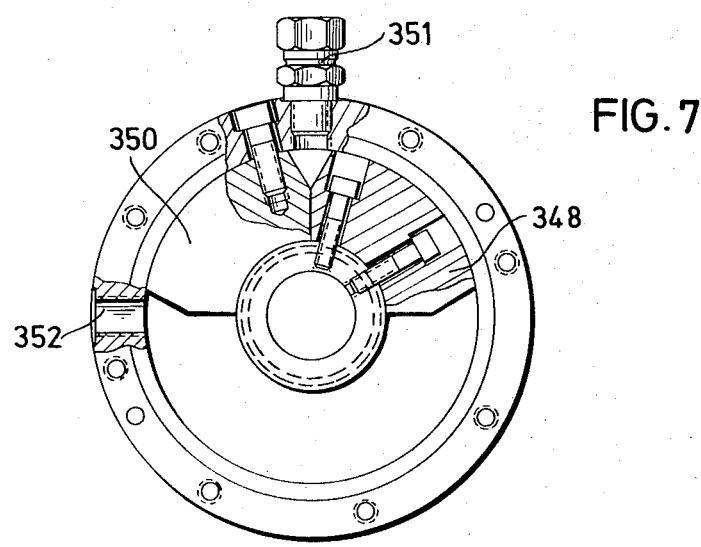
FIG. 7 is an axial section through an example in the form of a tension screw; and, FIG. 8 is a section corresponding to that in FIG. 6 but taken through the example shown in FIG. 7.

The rapid action clamp shown in FIGS. 7 and 8 differs from that shown in FIGS. 5 and 6 in that instead of applying a thrust, the clamp applies a traction, and in that the preliminary clamping is effected entirely by axial movement of the rotary piston motor.

The thrust pin is supported as described before. The rotary piston housing is not installed by screwing but has a tubular or sleeve-like extension skirt which slides axially up and down in an outer housing 339 fixed to a stationary holder 343. The skirt of the rotary piston housing 340 contains, in addition to the rotary actuator and thrust pin, a thrust member 338 which is fixed to the outer housing 339, by means of a pin 345 and a screw 344. The pin 345 passes through an opening in a traction member 346 which surrounds the thrust member 338, there being enough clearance between these two members to allow them to move freely relative to each other. The traction member 346 is screwed into the open end of the tubular skirt of the rotary piston housing 340. Fixed to the bottom of the traction member 346 there is a traction pin 347 which passes through a central bore in the bottom of the fixed outer housing 339. The rotary piston housing 340 is prevented from rotating relative to the outer housing 339 by the pin 345 and the walls of the opening in the traction member 346 through which the pin passes.

The rotary piston 348 of the rotary motor consists of a ring onto the wall of which is screwed a segment-shaped rotary piston vane which slides around the inner wall surface of the rotary piston 340, a good seal being formed between the sliding surfaces. The upper end of the ring is retained in a bore in the cover 349 of the rotary piston housing 340. The lower end of the ring is retained in a central bore of the rotary piston housing 340. The ring contains a pin 342 projecting upwards from the rotary actuator and through the rotary piston housing 340. The pin 342 is keyed to the ring of the rotary piston so that the pin can slide up and down in the ring.

The angular movement of the rotary piston 348 is limited by a further segment 350 which is fixed to the wall of the rotary piston housing 340 by a screw. When the rotary motor is in operation the surface of the rotating ring slides on the inner face of the segment 350, a good seal being formed between these two parts. The segment 350 limits the angular freedom of movement of the rotary piston 348, limiting it to 180°. The segment 350 therefore determines the initial and final positions of the spring-loaded thrust pin.

The device functions as follows. The holder 343 is fastened securely to a stationary object. The traction pin 347 is secured, for example to a workpiece. After applying a preliminary tension, pressure is applied to the rotary piston 348 and the thrust pin is swung around into an axially parallel position. This movement can take place at any desired speed. During this movement the rotary piston housing 340 slides axially outwards relative to the fixed outer housing 339, the traction member 346 moving upwards with the housing 340 against the influence of a spring 353 acting between the traction member 346 and the thrust member 338.

We claim:

1. A rapid action clamp, particularly for clamping tools, workpieces or other devices to machine tools, said clamp comprising a thrust assembly through which a thrust is applied to the part to be clamped, an axially compressible thrust pin, means pivotally connecting said thrust pin at one end to said thrust assembly eccentrically of the axis of said thrust assembly, a rotary actuator, means rotatably mounting said actuator coaxially with said thrust assembly and for axial movement relative to each other, means pivotally connecting said thrust pin at its other end to said rotary actuator eccentrically of said axis of said thrust assembly and said actuator, whereby rotation of said actuator about said axis relative to said thrust assembly moves said thrust pin between a position in which it is skew to said axis and a position in which it extends parallel to said axis and exerts a clamping thrust, and spring loading means resisting axial compressive movement of said thrust pin through which said clamping thrust is transmitted from said actuator to said part which is to be clamped, said compressive movement taking place in the direction of thrust transmission against the action of said spring loading means when said thrust pin is moved into said position wherein it extends parallel to said axis.

2. A clamp according to claim 1, including means for coupling said rotary actuator and said thrust assembly for rotation together, and means for uncoupling said rotary actuator and said thrust assembly to allow rotation of said actuator relative to said thrust assembly when it is desired to exert the clamping thrust.

3. A clamp according to claim 2, including a housing rotatively fixed to said thrust assembly and means mounting said housing coaxially surrounding said rotary actuator, and said means for coupling said actuator and said thrust assembly comprising means defining a bore in said actuator, means defining a recess in said housing adjacent said actuator, a driver pin, second spring loading means, and means mounting said driver pin and said second spring loading means in said bore whereby said driver pin is biased into engagement with said recess.

4. A clamp according to claim 3, wherein said driver pin has a sloping surface on its end which cooperates with said recess in said housing, whereby when the torque applied to said rotary actuator as said actuator is rotated reaches a predetermined value said driver pin slips out of engagement with said housing against the action of said second spring loading, thereby automatically uncoupling said rotary actuator from said housing.

5. A clamp according to claim 4, when including means for adjusting said second spring loading.

6. A clamp according to claim 4, wherein said rotary actuator includes a lock for locking said driver pin in engagement with said housing if so desired.

7. A clamp according to claim 6, wherein said lock comprises a rod, means mounting said rod in said actuator whereby said rod is spring loaded into engagement with said driver pin to prevent disengagement of said pin from said housing, and catch means for holding said rod away from said driver pin.

8. A clamp according to claim 1, including a motor for rotating said rotary actuator, said motor being driven by motive power selected from the group consisting of hydraulic power, pneumatic power, and electric power.

9. A clamp according to claim 8, wherein said motor is a fluid pressure operated rotary piston motor including an annular piston housing, a rotary piston, and means rotatably mounting said piston in said piston housing, said clamp including means connecting said rotary actuator to said rotary piston.

10. A clamp according to claim 9, including a mechanical stop located in said piston housing for limiting the angle of rotation of said rotary piston.

11. A clamp according to claim 9, wherein said rotary actuator is connected coaxially to said rotary piston, and said means connecting said actuator to said piston is arranged whereby said actuator can slide axially relative to said piston but cannot rotate relative to said piston.

12. A clamp according to claim 11, wherein said connecting means includes an axially projecting pin of polygonal cross section on said rotary piston, and means defining a correspondingly shaped recess in said rotary actuator, said axially projecting pin fitting in said correspondingly shaped recess.

13. A clamp according to claim 12, wherein said axially projecting pin has means defining an axial bore therethrough, and a bolt passes through said axial bore and is screwed into said rotary actuator to hold said pin in engagement with said actuator.

14. A clamp according to claim 13, including stops for limiting the distance between said rotary piston and said rotary actuator.

15. A clamp according to claim 3, wherein said housing has an internal wall defining a bore, and said thrust assembly includes a clamping part, means mounting said clamping part for axial sliding movement in said bore of said housing and for action upon by said thrust pin, and a locking ring mounted in said internal wall of said housing for retaining said clamping part in said housing, said clamping part having means defining a peripheral annular groove around said clamping part of dimensions which allow axial movement of said clamping part, said locking ring projecting into said peripheral annular groove.

16. A clamp according to claim 15, wherein said clamping part comprises a plurality of elements which are assembled to define said peripheral annular groove.

17. A clamp according to claim 16, wherein said clamp part includes a gripping member for engaging the piece to be clamped, a main member on which said thrust pin acts, a mounting pin projecting from said main member, and means mounting said gripping member on said mounting pin.

18. A clamp according to claim 17, wherein said mounting means includes a circlip which cooperates with said mounting pin to retain said gripping member on said pin.

19. A clamp according to claim 15, including means defining an axial groove in said internal wall of said housing, and a locking pin mounted on said clamping part and engaging in said groove to prevent rotation of said clamping part relative to said housing.

20. A clamp according to claim 11, including a housing operatively connected to said thrust assembly, a stationary sleeve, means fixing said rotary piston housing to said stationary sleeve, and cooperating screw threads on said housing and said stationary sleeve whereby said housing is screwed to said sleeve.

21. A clamp according to claim 11, wherein said rotary piston housing has a cylindrical skirt which surrounds said rotary actuator, and said clamp includes a fixed housing, means mounting said skirt in said fixed housing for axial sliding movement but not for rotation, said thrust assembly includes a thrust member on which said thrust pin acts remote from said rotary actuator, means fixing said thrust member to said fixed housing whereby when said clamping thrust is exerted, said rotary actuator and said piston housing are moved axially relative to said thrust member, and a traction member for engaging a workpiece, and means attaching said traction member to said piston housing whereby a traction is exerted on said workpiece when said clamping thrust is exerted.

22. A clamp according to claim 21, wherein a compression spring acts between said traction member and said fixed thrust member.

23. A clamp according to claim 22, wherein said traction member is attached to said skirt and said fixed housing has means defining an opening through which said traction member projects.

24. A clamp according to claim 21, wherein said rotary actuator has a pin projecting from it, and said clamp includes keying means which keys said rotary piston to said pin projecting from said rotary actuator.

25. A clamp according to claim 2, wherein said thrust assembly includes a rotatable housing which coaxially surrounds said rotary actuator and a thrust member, means axially slidably mounting said thrust member and said rotary actuator in said housing with said thrust pin acting between them, thrust bearings for said thrust member and said rotary actuator at opposite ends of said housing, collars mounted in said housing at opposite ends for retaining said thrust member and said rotary actuator and arranged whereby when the clamping thrust is exerted, said housing is caused to move axially relative to either said rotary actuator or said thrust member, a clamping member, and screw threaded means through which said housing cooperates with said clamping member.

26. A clamp according to claim 25, including a bearing bush having a shoulder located adjacent the end of said housing containing said thrust member, a part on said thrust member working in said bearing bush, and springs acting between said shoulder and said collar at said end of said housing.

27. A clamp according to claim 25, wherein at least said collar associated with said thrust member is screwed into said housing.

* * * * *